(12) United States Patent
Suzuki

(10) Patent No.: US 6,862,687 B1
(45) Date of Patent: Mar. 1, 2005

(54) CHECKING DEVICE AND RECORDING MEDIUM FOR CHECKING THE IDENTIFICATION OF AN OPERATOR

(75) Inventor: Hideo Suzuki, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/508,826

(22) PCT Filed: Oct. 20, 1998

(86) PCT No.: PCT/JP98/04745

§ 371 (c)(1),
(2), (4) Date: Mar. 16, 2000

(87) PCT Pub. No.: WO99/21073

PCT Pub. Date: Apr. 29, 1999

(30) Foreign Application Priority Data

Oct. 23, 1997 (JP) .............................................. 9-291107

(51) Int. Cl.[7] .............................................. G06F 11/30
(52) U.S. Cl. ................................................... 713/202
(58) Field of Search ................................ 713/202, 201, 713/200, 184, 183; 382/115, 123

(56) References Cited

U.S. PATENT DOCUMENTS

| | | | |
|---|---|---|---|
| 5,345,549 A | | 9/1994 | Appel et al. |
| 5,559,961 A | * | 9/1996 | Blonder ....................... 713/202 |
| 6,118,872 A | * | 9/2000 | Kashima et al. ............. 380/205 |
| 6,209,104 B1 | * | 3/2001 | Jalili ........................... 713/202 |
| 2001/0044906 A1 | * | 11/2001 | Kanevsky et al. ........... 713/202 |
| 2002/0029341 A1 | * | 3/2002 | Juels et al. .................. 713/184 |
| 2002/0031223 A1 | * | 3/2002 | Knighton et al. ............ 380/202 |
| 2003/0093699 A1 | * | 5/2003 | Banning et al. ............. 713/202 |

FOREIGN PATENT DOCUMENTS

| | | |
|---|---|---|
| EP | 0 543 304 A1 | 5/1993 |
| EP | 0 677 801 A1 | 10/1995 |
| WO | WO 99/39941 | 8/1999 |

OTHER PUBLICATIONS

Windows 95 for Dummies, Andy Rathbone, 1995, IDG Books Worldwide, pp.: 100 and 105.*

Programming in Windows 3.1, Tim Farrell et al., 1992, Que Corporation, pp. 417,443, 444, 485, and 486.*

FileGuard 3.2, Dec. 2, 1999, [Retrieved from Internet May 3, 2004], "http://www.macstop.co.uk/fileguard.htm".*

"Working in Windows 95", Jul. 28, 1999, [Retrieved from Internet May 3, 2004], "http://www.wcupa.edu/WebPage/Vpis.sat/window95".*

"How to Make a Windows Screen Saver in Delphi", Apr. 1, 1997, [Retrieved from Internet May 3, 2004], "http://www.mindspring.com/~cityzoo/scrnsavr.html".*

Windows 95 for Dummies, Andy Rathbone, 1995, IDG Books Worldwide.*

"Menu Icon with Hidden Geometrical Password", IBM Technical Disclosure Bulletin, vol. 32, No. 10B, Mar. 1, 1990, pp. 463–464, XP000097958—entire document.

* cited by examiner

Primary Examiner—Gregory Morse
(74) Attorney, Agent, or Firm—Frishauf, Holtz, Goodman & Chick, P.C.

(57) ABSTRACT

A CPU displays an image on a display device with reference to an image location table stored in advance in a RAM. When coordinates on the image are sequentially designated by an input device, the CPU sequentially compares the locations specified by the designated coordinates with those of checking points stored in the image location table. The CPU determines that the operator is authorized when errors or differences between the locations compared with each other are within an allowable range and when the order of designation of the coordinates is appropriate.

6 Claims, 6 Drawing Sheets

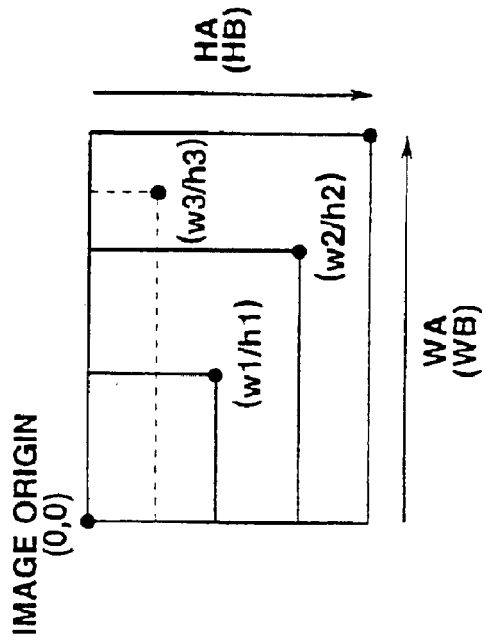
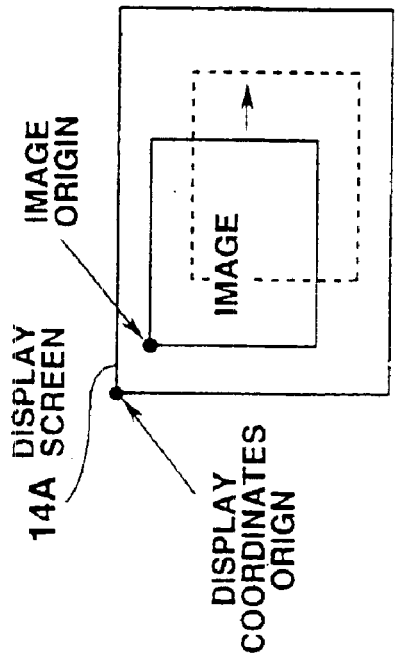
FIG.3A
FIG.3B
FIG.3C
FIG.3D

| IMAGE WINDOW | DISPLAY POSITION | REGISTERED COORDINATES |
|---|---|---|
| IMAGE A | | |
| IMAGE B | | |
| IMAGE C | | |

| NAME OF WINDOW | DISPLAY ICON | REGISTERED ICON |
|---|---|---|
| HEAD WINDOW | a,b,c,d | a |
| WINDOW A | e,f,g,h | g |
| WINDOW G | i, j, k | i |

CHECKING DEVICE AND RECORDING MEDIUM FOR CHECKING THE IDENTIFICATION OF AN OPERATOR

TECHNICAL FIELD

The present invention relates to a checking device for checking the operator of information equipment, and a recording medium which stores programs for working a computer as such a checking device.

BACKGROUND ART

Of late, information equipment like a personal computer, an input portable terminal, etc. has become widely used.

In general, such information equipment is designed so that users can be restricted by checking passwords, in order to prevent information from being accessed by unauthorized persons.

However, the input of passwords is troublesome. This is so especially in the case of a pen input portable terminal with no keyboard.

DISCLOSURE OF INVENTION

It is accordingly an object of the present invention to facilitate an operation for checking the operator who uses information equipment.

According to one aspect of the present invention, there is provided a checking device for checking an operator, comprising:

storage means for storing in advance an image and a location of at least one checking point set to the image;

display means, having a display screen, for displaying the image;

designation means for designating any point on the display screen of the display means; and checking control means for making the display means display the image stored in the storage means in order to check the operator (to check whether the operator has a right to use the information equipment), detecting that any point on the display screen of the display means has been designated by the designation means, and determining that checking is O.K (i.e. the operator has a right to use the information equipment), when a location of the point designated by the designation means corresponds to the location of the at least one checking point stored in the storage means.

According to the checking device described above, checking is performed by the simple operation of designating at least one checking point on the image. In the case of the input of a password, there is the great risk that a person who is unauthorized to use the pen input portable terminal can easily guess the password from the motions of the user's hands or the touch pen at the time of the input of the password. However, the present invention does not entail such a risk, since the location of any point designated on the image is checked. If mere coordinates on the display screen which is not displaying such an image are to be designated, there will be the great possibility that the user may forget where they are. In the present invention, however, since the checking point as registered is a point on the image, the user can easily remember its location and therefore can easily designate it.

According to the present invention, a plurality of images may be displayed sequentially. In this case, checking is performed by the simple operation of designating a checking point on each of the images displayed sequentially. In the case of the input of a password, there is the great risk that a person who is unauthorized to use the pen input portable terminal can easily guess the password from the motions of the user's hands or the touch pen at the time of the input of the password. In the present invention, however, the locations of any points designated on the images are checked. Therefore, the present invention does not entail such a risk. If mere coordinates on the display screen which is not displaying such an image are to be designated, there will be the great possibility that the user may forget where they are. In the present invention, however, since the checking points as registered are points on the images, the user can easily remember their locations, and therefore can easily designate them.

Furthermore, according to the present invention, checking may be performed by the simple operation of selecting and designating a plurality of images which are displayed sequentially. In the case of the input of a password, there is the great risk that a person who is unauthorized to use the pen input portable terminal can easily guess the password from the motions of the user's hands or the touch pen at the time of the input of the password. The present invention does not entail-such a risk, since checking is performed by selecting and designating the sequentially displayed images. If mere coordinates on the display screen which is not displaying such an image, there will be the great possibility that the user may forget where they are. The present invention does not have such a possibility, because the sequentially displayed images need only be selected and designated;

BRIEF DESCRIPTION OF DRAWINGS

FIG. 3A is a diagram showing a correspondence between an event and an image;

FIG. 3B is a diagram which illustrates an image location table;

FIG. 3C is a diagram for explaining a relationship between the size of an image and a checking point on the image;

FIG. 3D is a diagram for explaining the location of the image origin;

BEST MODE FOR CARRYING OUT THE INVENTION

First Embodiment

Figure 1A:
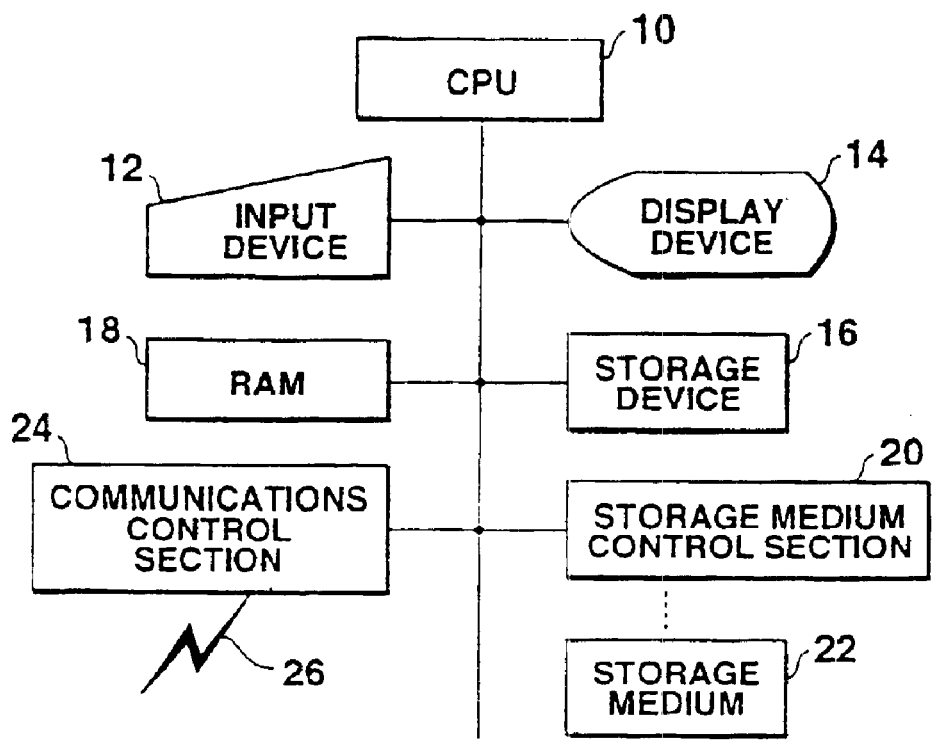
FIG. 1A is a block diagram illustrating the structure of the pen input portable terminal which employs a checking device according to the first embodiment of the present invention.

FIG. 1A is a diagram showing the structure of the pen input portable terminal employing the checking device according to the first embodiment of the present invention. In the illustration, reference numeral 10 denotes a CPU serving as a control section which controls the entirety of the pen input portable terminal. Reference numeral 12 represents an input device which includes a touch panel, a touch pen, etc. The touch panel is arranged at the display screen of a display device 14 such as an LCD display, for example. Reference numeral 16 denotes a storage device like a hard disk, a ROM or the like which stores images to be displayed, for example. Reference numeral 18 represents a RAM storing an image location table to be described later.

Reference numeral 20 denotes a storage medium control section which controls the storing and reading of data in and from a storage medium 22 such as a loaded floppy disk, an optical (magnetic) disk or the like. Reference numeral 24 represents a communications control section which transfers and receives data to and from an external device through a communications line 26 (which may be a cable or radio waves).

Processing programs and data, etc., which the CPU 10 executes to work as the checking device, are stored in the storage device 16 or the storage medium 22 in advance. Needless to say, however, they may not be in the storage device 16 or the storage medium 22, and may be received from any other device connected to the communications line 26 or the like, and then may be stored (in a non-illustrated work memory provided in the RAM 18, for example). Alternatively, any other device connected to the communications line 26 or the like may include a storage unit or a storage medium, and the programs and data stored therein may be transferred therefrom through the communications line 26.

Operations according to the above-described structure will now be described.

Figure 1B:
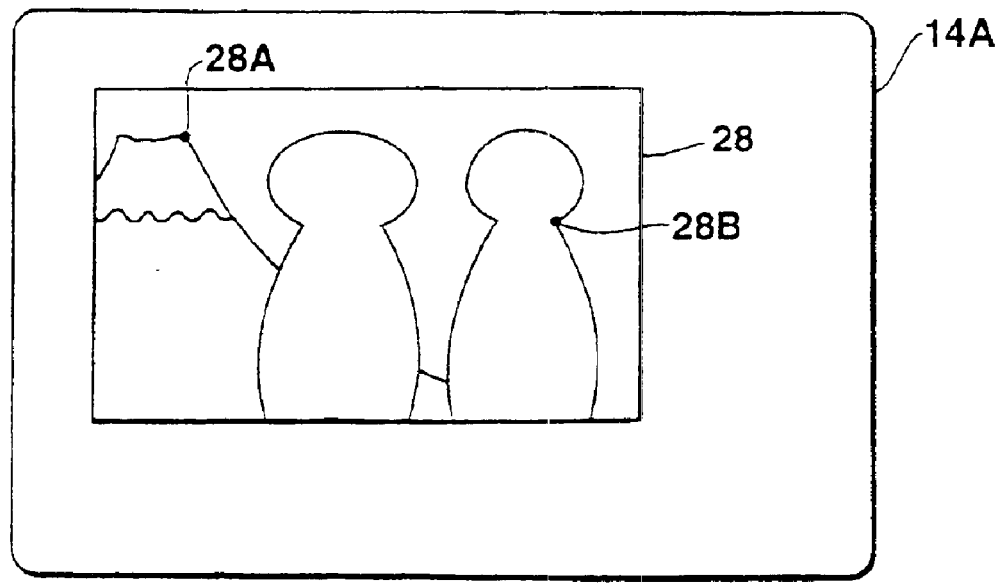
FIG. 1B is a diagram, illustrating a display screen, for explaining operations according to the first embodiment of the present invention.

According to the checking device of the first embodiment, as illustrated in FIG. 1B, the display screen 14A of the display device 14 displays an image 28 preset and stored in advance. When any points on the image 28 are designated by the touch pen of the input device 12, the checking device determines whether the locations of the designated points coincide with those of points 28A and 28B preset and stored in advance, thereby determining whether checking is O.K. or N.G.

Figure 2:
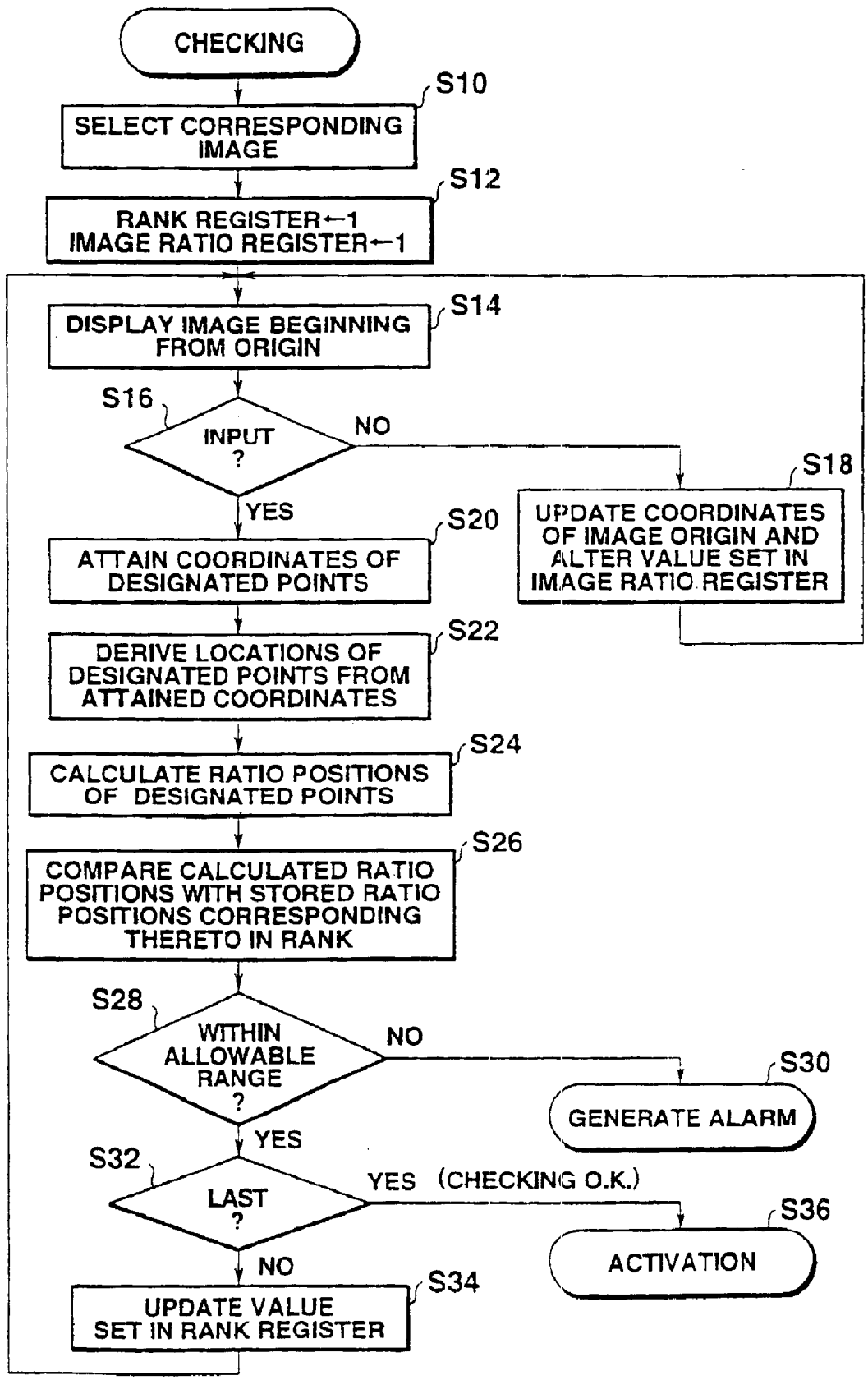
FIG. 2 is a flowchart for explaining how the pen input portable terminal which employs the checking device of the first embodiment of the present invention operates.

FIG. 2 is a flowchart showing such procedures. Either the storage device 16 or the storage medium 22 stores programs for realizing the individual functions shown in the above flowchart, in the form of program codes readable by the CPU 10.

FIG. 3A illustrates a table which a user has preset and stored in the RAM 18 in advance. This table lists a plurality of events (the activation of the pen input portable terminal and the activation of a specific application) and images (images A and B) in association with each other. First, the CPU 10 selects one of the images which corresponds to the current event from the table of FIG. 3A (step S1). After this, the CPU 10 sets the initial FP value "1" in both a rank register and an image ratio register, which are included in the CPU 10 or the RAM 18 (step S12).

The user can select one or more checking points on each image (A and B) and store their locations beforehand in the image location table stored in the RAM 18 and illustrated in FIG. 3B. The value set in the rank register indicates the order of designation of the checking points. As seen from FIG. 3B, the image location table stores, in association with each checking point, its location on the corresponding image and its rank in the designation order. The checking points' locations on the image are not relative coordinates from the origin (0, 0) which is located at the left corner of the image as shown in FIG. 3C (the relative coordinates of the checking point which is first in rank is (w1, h1), for example), but the "ratio positions" which are expressed in the ratio of the relative coordinates from the origin (0, 0) to the dimensions, i.e., the width WA (or WB) and height HA (or HB) of the image. This is because the scale of such an image can be freely increased or reduced. If the image scale is increased or reduced, variations will occur also in the points' locations (relative coordinates) from the origin. The ratio positions are adopted in view of such a possible change in the image scale. The value set in the image ratio register indicates the display scale of a selected image.

After the selection of the image and the initialization of each register, the CPU 10 makes the display device 14 display the selected image so as to begin from the image origin and on the scale represented by the value set in the image ratio register (step S14). The coordinates of the image origin are those from the display coordinates origin located at the upper left corner of the display screen 14A, and may be preset, prestored coordinates or may be randomly occurring coordinates.

Then the CPU 10 determines whether inputs have been made with the touch pen of the input device 12 (step S16). When the CPU 10 determines whether no inputs have been made, it updates the coordinates of the image origin, and alters the value set in the image ratio register (step S18), after which the CPU 10 returns to the step S14. As a result, the position and size of the image vary as shown by broken lines in FIG. 3D.

When the CPU 10 determines that inputs have been made with the touch pen, it attains the coordinates of the points designated by the touch pen (step S20), and derives the locations of the designated points from the attained coordinates (step S22). The location of each point can be derived by subtracting the coordinates of the image origin from the point's coordinates. Then, the CPU 10 calculates the ratio positions of the designated points on the basis of the derived locations and the dimensions of the image (step S24). In the case of a point whose location is specified by (xs, ys), for example, its ratio position is (xs/WA, ys/HA). Having thus calculated the ratio positions of the designated points, the CPU 10 compares the calculated ratio positions with those stored in the image location table and corresponding in rank to the calculated ratio positions (step S26), and determines whether any errors or differences between the ratio positions as compared with each other are within a predetermined allowable range (step S28). When the CPU 10 determines that the errors are not within the allowable range, it generates an alarm and terminates processing (step S30).

When the CPU 10 determines that the errors are within the allowable range, it refers to the image location table and determines whether the rank represented by the value set in the rank register is last or not (step S32). When the CPU 10 determines that the rank is not last, the CPU 10 updates (counts up) the value set in the rank-register (step S34) and returns to the step S14.

When the CPU 10 determines that the rank is last, then it determines that checking is O.K., and activates the pen input portable terminal or the application (step S36).

Thus, an image registered in advance, not a password input screen, is displayed and it is checked whether each of the points predetermined on the image has been designated by the touch pen. When it is determined that each of the predetermined points on the image has been designated by the touch pen, it is then determined that checking is O.K.

More specifically, the user selects a desired image in advance, and registers desired points on the image and their designation order in advance. At the time the pen input portable terminal is initially activated upon turning on of the power, or at the time a specific application is activated, the selected image is displayed on the display screen, and the pen input portable terminal waits until any points on the displayed image are designated by the touch pen (in this case, the display position and display size of the image are changed in order to enhance security). When any points on the displayed image are designated by the touch pen, it is determined whether the ratio positions (not the display coordinates) and designation order of the points coincide with those registered in advance. When it is determined that the ratio positions and designation order of the points coincide with those registered in advance, it is determined that checking is O.K., and then the terminal is rendered usable.

Thus, a troublesome input of a password is unnecessary. In the case of a password, there is the great risk that a person who is unauthorized to use the pen input portable terminal can easily guess the password from the motions of the user's hands or the touch pen at the time of the input of the password. In the present invention, however, the locations of the checking points designated on the image are checked. Accordingly, the present invention does not entail such a risk.

Since the checking points are points on the image, the user can easily remember their locations (if mere coordinates on the display screen which is not displaying such an image are to be designated, there is the great possibility that the user may forget their positions).

It is preferred that the display position and display size of the image be changed every time. (This will be helpful to enhance security. If the same point is designated again and again by the touch pen, the mark of the pen may be made on the display screen, which entails the possibility that any other person can perceive the locations of the points registered in advance. If, however, the display position and display size of the image is changed every time, the locations of the points to be designated by the touch pen are not constant, with a great merit of the aforementioned possibility being avoided.)

In the above embodiment, the ratio positions are set and stored in the image location table. Needless to say, however, the relative coordinates from the image origin can be stored therein in place of the ratio positions, if the image size is not changed.

Updating the coordinates of the image origin and altering the value set in the image ratio register are both performed in the step S18 of the above-described embodiment. However, one of them may be performed in the step S18.

Second Embodiment

The second embodiment of the present invention will now be described.

Figures 4A, 4B, 4C:
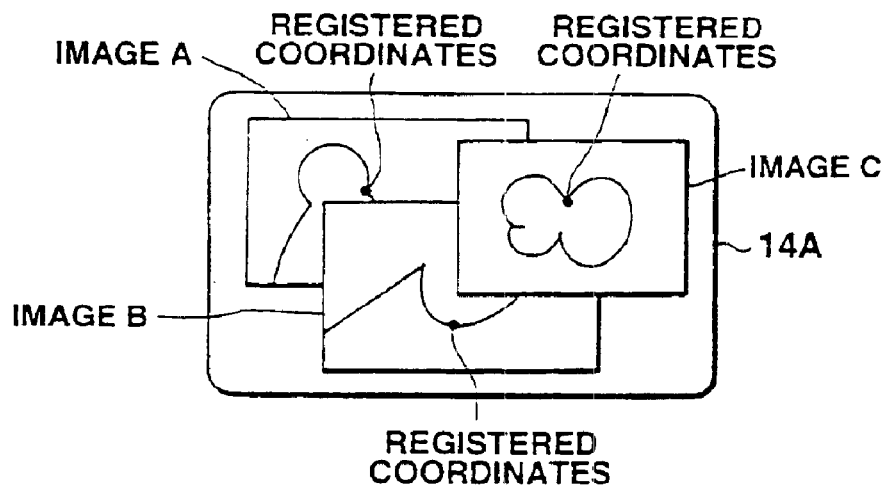
FIG. 4A is a diagram which illustrates an image location table according to the second embodiment of the present invention.
FIG. 4B is a diagram, illustrating the display screen, for explaining operations according to the second embodiment of the present invention.
FIG. 4C is a diagram which illustrates a check window table provided for each application in the third embodiment of the present invention.

The structure of the pen input portable terminal, which employs the checking device of the second embodiment, will not be explained hereinafter, since it is the same as that of the pen input portable terminal of the first embodiment. In the second embodiment, however, the image location table stored in the RAM 18 is as illustrated in FIG. 4A. More specifically, the image location table of the second embodiment stores, in association with each image window, its display position and its registered coordinates.

Figure 5:
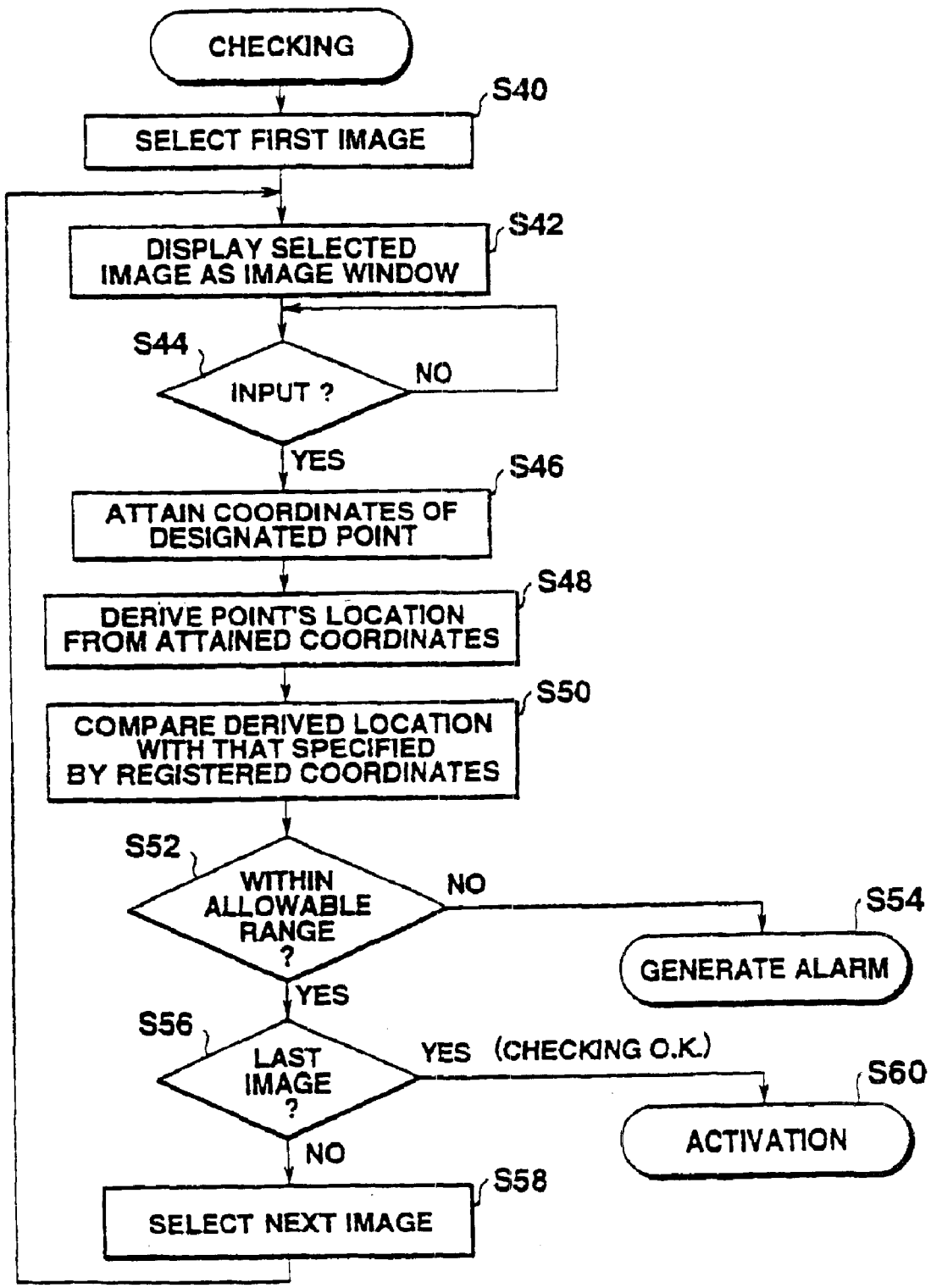
FIG. 5 is a flowchart for explaining how the pen input portable terminal which employs a checking device according to the second embodiment of the present invention operates.

FIG. 5 is a flowchart for explaining the operation of the pen input portable terminal employing the checking device of the second embodiment. The storage device 16 or the storage medium 22 stores the programs for realizing the individual functions shown in the above flowchart, in the form of the program codes readable by the CPU 10.

According to the second embodiment, the CPU 10 selects the first image (image A) from the image location table (step S40). Then, the CPU 10 makes the display device 14 display the selected image as an image window in accordance with the corresponding display position stored in the image location table (step S42). The CPU 10 waits until any input is made with the touch pen of the input device 12 (step S44).

When the CPU 10 determines that any input has been made with the touch pen, it attains the coordinates of the point designated by the touch pen (step S46), and derives the point's location from the attained coordinates in the same manner as that of the first embodiment (step S48). Then, the CPU 10 compares the derived location with that specified by the registered coordinates which the image location table stores in association with the selected image (step S50), and determines whether an error or difference between both locations as compared with each other is within a predetermined allowable range (step S52). When the CPU 10 determines that the error is not within the allowable range, it generates an alarm and terminates processing (step S54).

When the CPU 10 determines that the error is within the allowable range, it refers to the image location table and determines whether the selected image is the last image or not (step S56). When the CPU 10 determines that the selected image is not the last image, the CPU 10 selects the next image (step S58), and returns to the step S42.

When the CPU 10 determines that the selected image is the last image, then it determines that checking is O.K., and activates the pen input portable terminal (step S60).

Thus, according to the second embodiment, a plurality of images preset and stored in advance are sequentially displayed in order to perform checking, as illustrated in FIG. 4B. When it is detected during the display of the images that any points on the display screen have been designated, the locations of the designated points are compared with those stored in advance. When the locations of the designated points coincide with those stored in advance, it is determined that checking is O.K.

In the second embodiment, as well as in the case of the first embodiment, the display position and display size of the image window can be changed every time. Needless to say, the ratio positions may be adopted in place of the registered coordinates.

Third Embodiment

The third embodiment of the present invention will now be described.

The structure of the pen input portable terminal, which employs the checking device of the third embodiment, will not be explained hereinafter, because it is the same as that of the pen input portable terminal of the first embodiment.

In the third embodiment, however, the RAM 18 stores, not the image location table, but a checking window table provided for each application, as illustrated in FIG. 4C. The checking window table stores a plurality of display icons and a registered icon in association with each window.

Figure 6B:
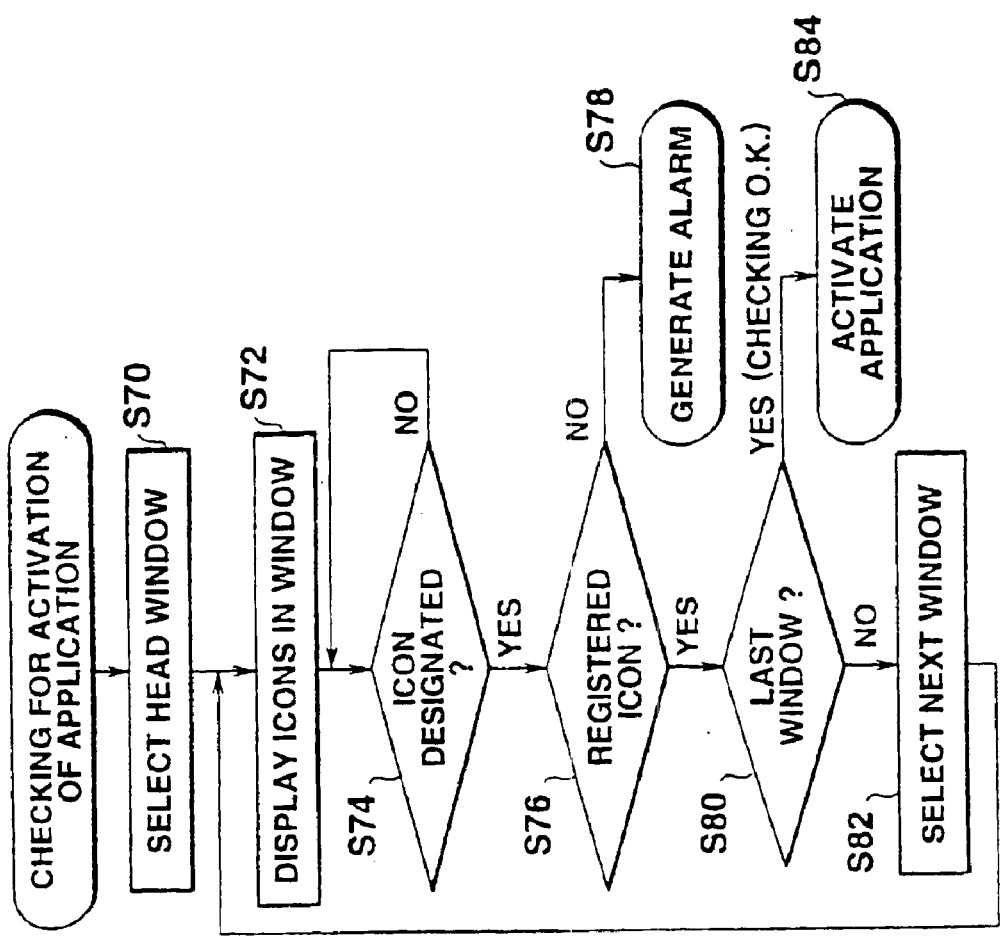
FIG. 6B is a flowchart for explaining how the pen input portable terminal which employs a checking device according to the third embodiment of the present invention operates.
Figure 6A:
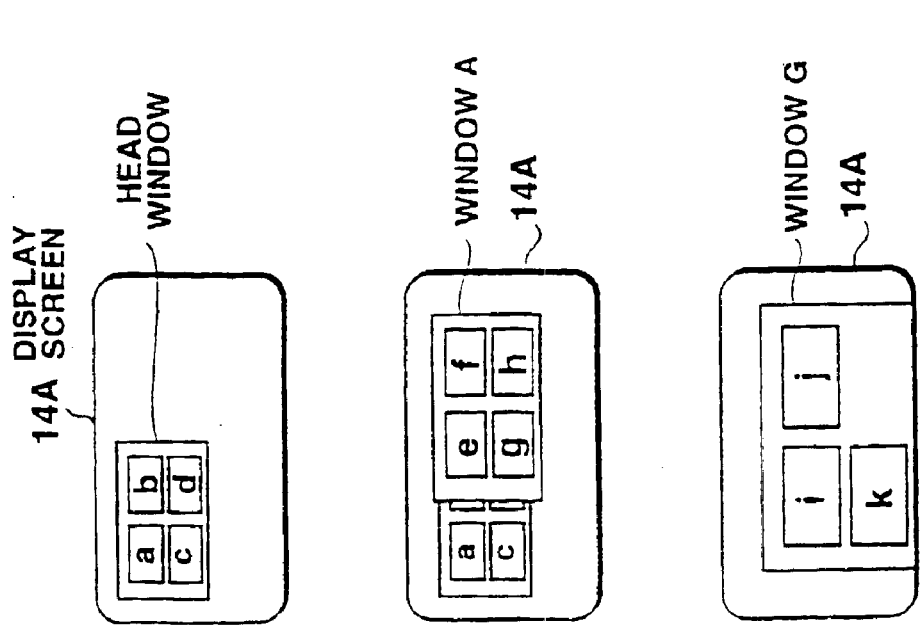
FIG. 6A is a diagram, illustrating variations of the display screen, for explaining operations according to the third embodiment of the present invention.

To be specific, when activating one application, a reference is made to the corresponding checking window table, and a plurality of icons are displayed in the head window as illustrated in FIG. 6A. When one of the icons displayed in the head window is selected and designated, it is determined whether the designated icon is identical with a registered one. In the case where the designated icon is identical with it, the next window (window A) is displayed. When a registered icon is designated in the last window (window G), it is determined that checking is O.K.

In that case, it is preferred that the icons be related in content with each other. For example, icon "a" is the image of a mountain, icon "b" is the image of an ocean, icon "c" is the image of a forest, icon "d" is the image of an island, icon "e" is the image of Mt. Everest, icon "f" is the image of Mt. Fuji, icon "g" is the image of Mt. Kilimanjaro, and icon is the image of Mt. Etna. Icon "i" is the image of Mt. Vesuvius, icon "j" is the image of Mt. Elbert, and icon "k" is the image of Mt. Cleveland.

FIG. 6B is a flowchart for explaining the above-described operation of the pen input portable terminal employing the checking device according to the third embodiment. The storage device 16 or the storage medium 22 stores the programs for realizing the individual functions shown in the above flowchart, in the form of the program codes readable by the CPU 10.

To be specific, according to the third embodiment, the CPU 10 selects the head window from the corresponding checking window table (step S70), and makes the display device 14 display icons in the selected window (step S72). The CPU 10 waits until any icon is designated with the touch pen of the input device 12 (step S74).

When any icon is designated with the touch pen, then the CPU 10 refers to the check window table and determines whether the designated icon is the registered icon which the check window table stores in association with the selected window (step S76). When the designated icon is not the registered icon, the CPU 10 generates an alarm and terminates processing (step S78).

When the designated icon is the registered icon, the CPU 10 refers to the checking window table and determines whether the currently selected window is the last window (step S80). When the currently selected window is not the last window, the CPU 10 selects the next window (step S82), and returns to the step S72.

When the currently selected window is the last window (window G), the CPU 10 determines that checking is O.K., and activates the corresponding application (step S84).

Explained in the first to third embodiments is the case where the checking device is applied to the pen input portable terminal. However, the present invention is not limited thereto, and the checking device is applicable also to any other information equipment such as a personal computer, etc.

What is claimed is:

1. A checking device for checking an operator of an apparatus, the checking device comprising:
   image storage means for storing a check image for checking the operator;
   registered data storage means for storing location data of a registered checking point set to the check image, the location data representing relative coordinates of the checking point with respect to an origin of the check image;
   display means, having a display screen, for displaying the check image based on a preset location of display coordinates on the display screen;
   attaining means for attaining coordinates of a point designated by the operator on the display screen;
   detection means for detecting relative coordinates of the designated point on the check image displayed on the display screen based on the preset location of the display coordinates, from the coordinates attained by the attaining means;
   comparison means for comparing the relative coordinates of the designated point detected by the detection means with the relative coordinates of the registered checking point represented by the location data stored in association with the check image;
   check control means for determining that the operator is authorized to use the apparatus when a difference between the relative coordinates of the registered checking point and the relative coordinates of the designated point is within an allowable range; and
   update means for updating the display coordinates location, which determines where the check image is displayed, such that the location at which the check image is displayed is altered;
   wherein when no designation is made by the operator on the display screen on which the check image is displayed, the display location of the check image is periodically altered.

2. The checking device according to claim 1, wherein:
   the registered data storage means stores a display size of the check image;
   the display means displays the check image in a predetermined display size; and
   the comparison means compares (i) a ratio between the relative coordinates of the designated point detected by the detection means and the display size of the check image with (ii) a ratio between the relative coordinates of the registered checking point and the display size of the check image.

3. The checking device according to claim 1, wherein:
   a respective check image and a corresponding registered checking point set to the check image are prepared for each one of a plurality of programs, and are stored in the image storage means and in the registered data storage means according to the corresponding one of the plurality of programs; and
   when any of the plurality of programs is activated, the corresponding check image is selected for display, and checking of the designated point is performed based on the registered checking point corresponding to the activated program.

4. A computer-readable recording medium which stores a program for controlling a computer to perform the steps of:
   storing location data of a registered checking point which is set to a check image in registered data storage means, the location data representing relative coordinates of the registered checking point with respect to an origin of the check image;

displaying the check image on a display screen based on a preset location of display coordinates;

attaining coordinates of a point designated by an operator on the display screen;

detecting relative coordinates of the designated point on the check image displayed on the display screen based on the preset location of the display coordinates, from the attained coordinates;

comparing the detected relative coordinates of the designated point with the relative coordinates of the registered checking point stored in association with the check image;

determining that the operator is an authorized operator when a difference between the relative coordinates of the designated point and the relative coordinates of the registered checking point is within an allowable range; and updating the display coordinates location, which determines where the check image is displayed, such that the location at which the check image is displayed is altered;

wherein when no designation is made by the operator on the display screen on which the check image is displayed, the display location of the check image is periodically altered.

5. A checking device for checking an operator of an apparatus, comprising:

image storage means for storing a check image used for checking the operator;

registered data storage means for storing location data of a registered checking point set to the check image, the location data representing relative coordinates of the registered checking point with respect to an origin of the check image, and for storing a display size of the check image;

display means, having a display screen, for displaying the check image based on a preset location of display coordinates on the display screen in a predetermined display size;

attaining means for attaining coordinates of a point designated by the operator on the display screen;

detection means for detecting relative coordinates of the designated point on the check image displayed on the display screen based on the preset location of the display coordinates, from the coordinates attained by the attaining means;

comparison means for comparing (i) a ratio between the relative coordinates of the designated point detected by the detection means and the display size of the check image with (ii) a ratio between the relative coordinates of the registered checking point and the display size of the check image;

check control means for determining that the operator is authorized to use the apparatus when a difference between the two ratios is within an allowable range; and update means for updating the display size of the check image, such that the display size of the check image is altered;

wherein when no designation is made by the operator on the display screen on which the check image is displayed, the display size of the check image is periodically altered.

6. A computer-readable recording medium which stores a program for controlling a computer to perform the steps of:

storing location data of a registered checking point which is set to a check image, the location data representing relative coordinates of the registered checking point with respect to an origin of the check image, and storing a display size of the check image;

displaying the check image in a predetermined display size on a display screen based on a preset location of display coordinates;

attaining coordinates of a point designated by an operator on the display screen;

detecting relative coordinates of the designated point on the check image displayed on the display screen based on the preset location of the display coordinates, from the attained coordinates;

comparing (i) a ratio between the detected relative coordinates of the designated point and the display size of the check image with (ii) a ratio between the relative coordinates of the registered checking point and the display size of the check image;

determining that the operator is an authorized operator when a difference between the two ratios is within an allowable range; and updating the display size of the check image, such that the display size of the check image is altered;

wherein when no designation is made by the operator on the display screen on which the check image is displayed, the display size of the check image is periodically altered.

* * * * *